(12) United States Patent  
Bryant

(10) Patent No.: US 9,290,120 B2
(45) Date of Patent: Mar. 22, 2016

(54) INCLINE LIFT SYSTEM FOR CARGO CONTAINERS

(71) Applicant: GM Global Technology Operations LLC, Detroit, MI (US)

(72) Inventor: Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 82 days.

(21) Appl. No.: 14/190,879

(22) Filed: Feb. 26, 2014

(65) Prior Publication Data

US 2015/0239386 A1 Aug. 27, 2015

(51) Int. Cl.
 *B60P 1/64* (2006.01)

(52) U.S. Cl.
 CPC ............ *B60P 1/6436* (2013.01); *B60P 1/6454* (2013.01); *B60P 1/6481* (2013.01)

(58) Field of Classification Search
 CPC ..... B60P 1/6454; B60P 1/6436; B60P 1/6481
 USPC .................................. 414/527, 488, 467, 812
 See application file for complete search history.

(56) References Cited

U.S. PATENT DOCUMENTS

| | | | | |
|---|---|---|---|---|
| 3,850,283 A * | 11/1974 | Nordstrom | ............... | B60P 1/52 198/313 |
| 4,165,810 A * | 8/1979 | Young | ..................... | B64C 1/22 187/241 |
| 5,697,753 A * | 12/1997 | Aurora | ................... | B65G 67/08 414/398 |
| 6,490,979 B1 * | 12/2002 | Pfleger | .................. | B65G 19/02 104/128 |
| 6,644,210 B1 * | 11/2003 | Pfleger | ................. | B66B 31/006 104/128 |
| 7,014,410 B2 * | 3/2006 | Barry | .................... | B61D 47/00 414/337 |
| 7,931,136 B2 * | 4/2011 | Webster | ................ | B65G 19/02 198/322 |
| 8,328,003 B2 * | 12/2012 | Webster | ............... | B66B 31/006 104/172.3 |
| 8,424,668 B2 * | 4/2013 | Gonzalez | ............... | B66B 29/06 198/324 |
| 9,061,624 B2 * | 6/2015 | Bryant | ..................... | B60P 1/48 |
| 2014/0219752 A1 * | 8/2014 | Chamberlain | ........ | B60P 1/6436 414/352 |
| 2014/0219754 A1 * | 8/2014 | Timonen | ............... | B60P 1/6436 414/502 |
| 2014/0219757 A1 * | 8/2014 | Wisniewski | ............ | B60P 1/00 414/541 |
| 2014/0238992 A1 * | 8/2014 | Stauff | .................. | B62B 3/1404 220/485 |

* cited by examiner

*Primary Examiner* — Kaitlin Joerger

(74) *Attorney, Agent, or Firm* — BrooksGroup

(57) ABSTRACT

A product including a containerized cargo system for the loading and unloading of cargo with the use of an inclined lift system which includes at least one motorized belt having a hooking feature which mates with a cavity located on the cargo container in order to lift the cargo container off and onto the ground for the unloading and loading of a truck and a method of doing the same.

18 Claims, 6 Drawing Sheets

INCLINE LIFT SYSTEM FOR CARGO CONTAINERS

TECHNICAL FIELD

The field to which the disclosure generally relates to includes vehicle lift systems.

BACKGROUND

A vehicle may include one or more lift systems.

SUMMARY OF ILLUSTRATIVE VARIATIONS

One variation may include a method including a containerized cargo system for the loading and unloading of cargo with the use of an incline lift system using motorized belts which include a hooking feature and cargo containers which include a cavity which mates with the hooking feature which lifts and lowers cargo containers to and from a delivery truck.

Another variation may include a product including a truck that may include at least one motorized belt which may include a hooking feature which may mate with a cavity in a cargo container to lift the cargo container off the ground onto the truck for transportation and to place the cargo container back onto the ground for delivery.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
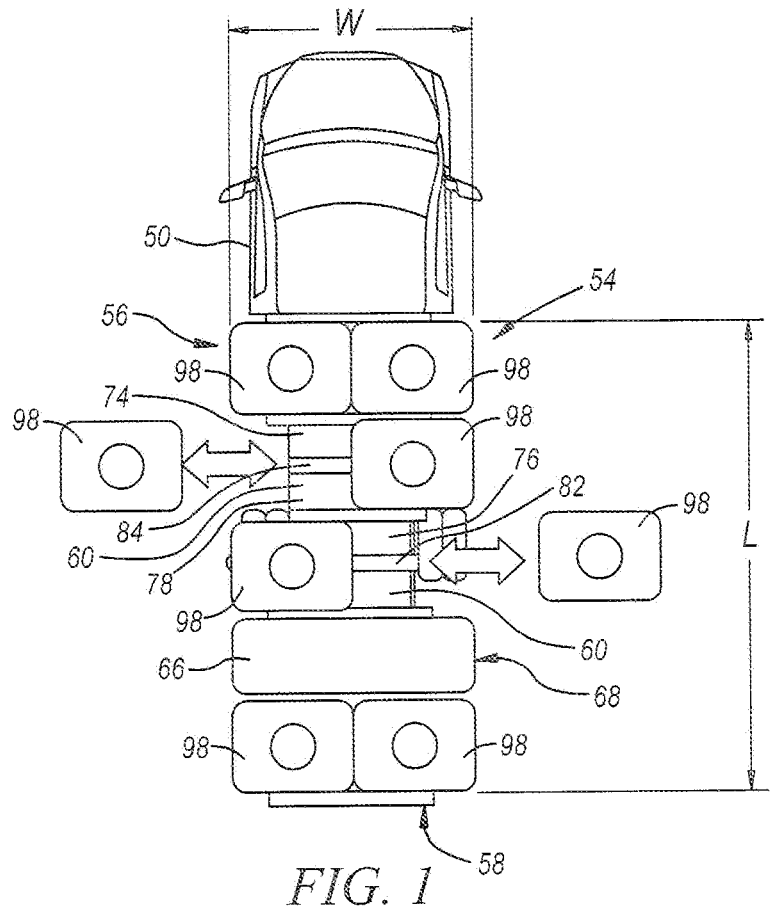
FIG. 1 depicts an overhead view of a truck including an incline lift system according to a number of variations.
Figure 2:
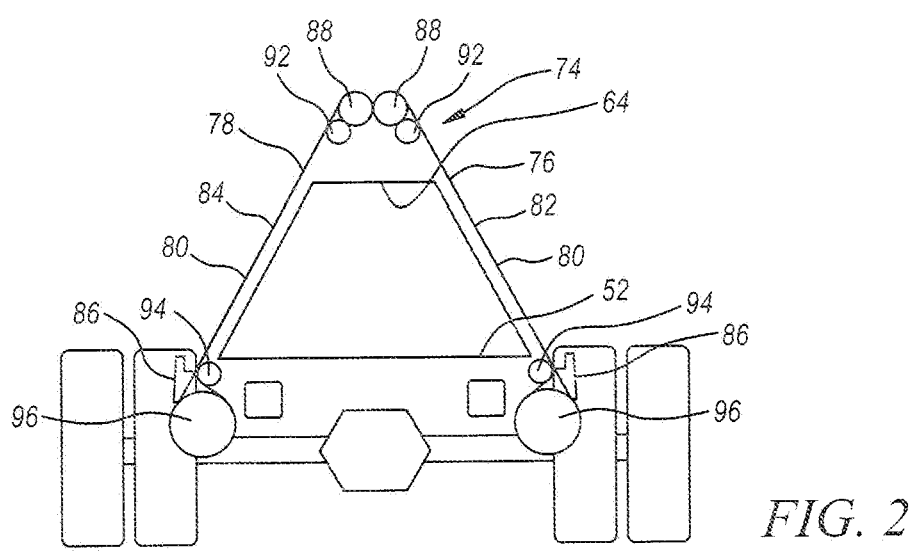
FIG. 2 depicts a rear view of a truck including an incline lift system according to a number of variations.
Figure 3:
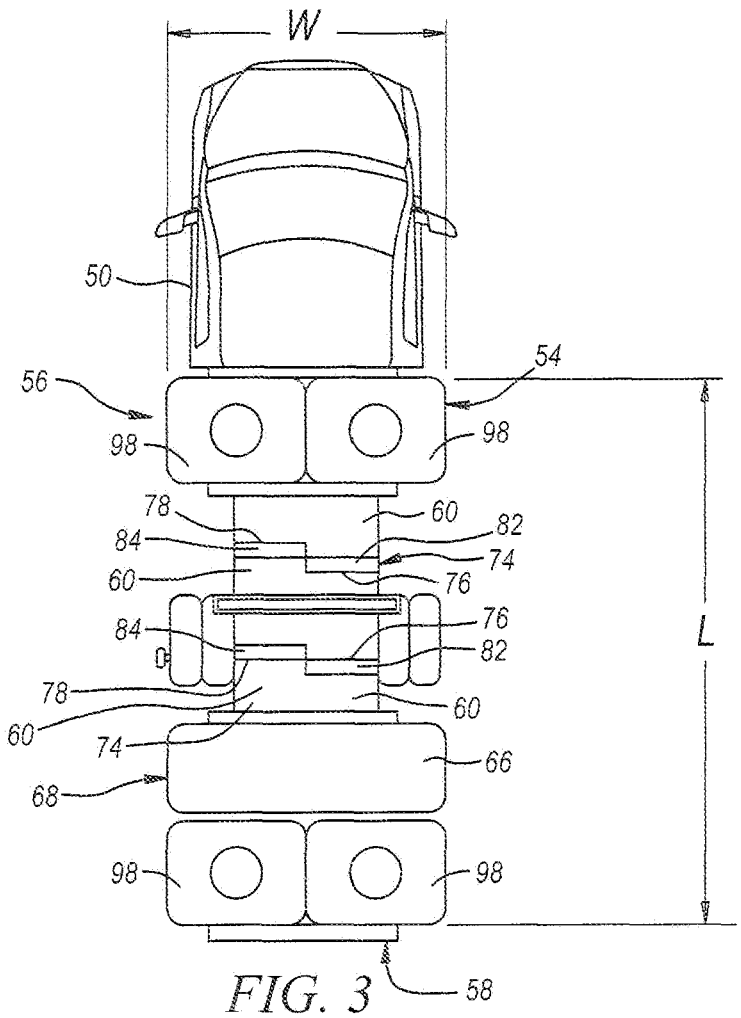
FIG. 3 depicts an overhead view of a truck including an incline lift system according to a number of variations.

Referring to FIGS. 1-5, a truck 50 may include a conventional-height truck bed platform 52 and may allow for access to the inside of the truck 50 through the right hand side 54 and/or the left hand side 56 of the truck 50 as well as the rear end 58 of the truck 50. A truck 50 may include several storage spaces or container slots 60 in its truck bed platform which may be used to hold various cargo containers 98, for example as illustrated in FIGS. 1 and 3. The container slots 60 may be spaced apart in any of a number of variations including, but not limited to, symmetrically along the length L of the truck bed platform 52 on both the right hand side 54 and the left hand side 56 of the truck 50.

At least one row of container slots 60 may include an incline lift system 74 which may assist in the loading and unloading of cargo containers 98 to and from the truck 50. This may also allow individual loading and unloading of cargo containers 98 on either side of the truck 50.

The incline lift system 74 may include at least one symmetrical first motorized belt system 76 and second motorized belt system 78 which may help in the efficiency of loading and unloading cargo containers 98 by lifting the cargo containers 98 onto and off of a truck 50. The first motorized belt system 76 may include a first belt 82 and the second motorized belt system 78 may include a second belt 84. The motorized belt systems 76, 78 may include an inclined surface 80 which extends toward the center of the truck 50 and toward each other. The first belt 82 and the second belt 84 may each include a hooking feature 86 which may be constructed and arranged to accept a mating cavity feature 116 on a cargo container 98, for example as illustrated in FIGS. 2, 4.

In one variation, the first belt 82 and the second belt 84 may be located on adjacent opposite sides approximately center of each of the container slots 60, for example as illustrated in FIG. 1. In this variation, the first and second belts 82, 84 may each include a first shaft 88, second shaft 92, third shaft 94, and fourth shaft 96, for example as illustrated in FIG. 2. Each shaft 88, 92, 94, 96 may be coupled to a motor including, but not limited to, an electric motor (not shown) which may rotate the shafts 88, 92, 94, 96 to turn either clockwise, or counter clockwise which may drive the belt 82, 84 either upwards or downwards which may cause the belt hook feature 86 to move upwards or downwards.

Figure 4:
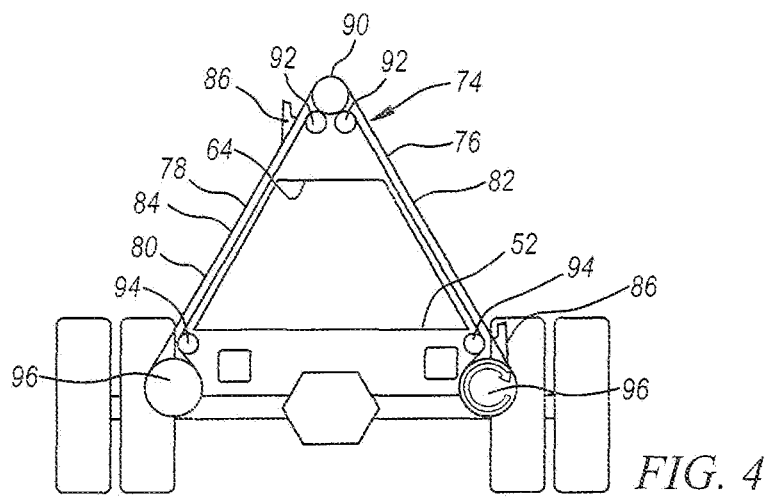
FIG. 4 depicts a rear view of a truck including an incline lift system according to a number of variations.

In another variation, the first motorized belt system 76 and the second motorized belt system 78 may each share a center first shaft 90, for example as shown in FIG. 4. In this variation the first belt 82 may be offset from the width of the second belt 84, for example as illustrated in FIG. 3. Each belt 82, 84 may also be coupled to its own second shaft 92, third shaft 94, and fourth shaft 96. Each motorized belt system 76, 78 may be motorized by an independent motor including, but not limited to, an electric motor (not shown) which may rotate the shafts 90, 92, 94, 96 clockwise or counterclockwise which may drive the belts 82, 84 to move upwards or downwards which may cause the belt hook feature 86 to move upwards or downwards.

The motorized belt system 76, 78 may include a control device (not shown) in any of a number of variations including, but not limited to, a push button start/stop, a push lever start/stop, or a wireless remote control device which may operate all of the belt 82, 84 positions. Each motorized belt system 76, 78 may also include positional sensors (not shown) which may stop the belt 82, 84 in an appropriate upwards or downwards position. The motorized belt systems 76, 78 may also be equipped with at least one emergency stop control including, but not limited to, sensors, or hardwired buttons or pull cords, near each incline lift system 74.

A hollow structure 64 may run through the length of the truck bed 52 and may be located within the first inclined belt system 76 and the second inclined belt system 78 approximately center of the truck bed 52. The hollow structure 64 may be used as a fuselage type storage area which may be located within the motorized belt systems 76, 78 and which may be accessed through the rear 58 of the truck 50. The hollow structure may be any of a number of shapes including, but not limited to, trapezoidal, for example as illustrated in FIGS. 2 and 4, or triangular. The hollow structure 64 may allow for additional storage, including lengthy cargo.

Further, the truck 50 may include one or more storage areas 66 located over one or more container slots 60 which may be used for "loose" cargo not placed inside a cargo container 98. The storage areas 66 may be located in any of a number of locations in the truck bed 52 including, but not limited to above the wheel house 68, which may be accessed from outside either side of the truck 50, for example as illustrated in FIGS. 1 and 3.

Figure 5:
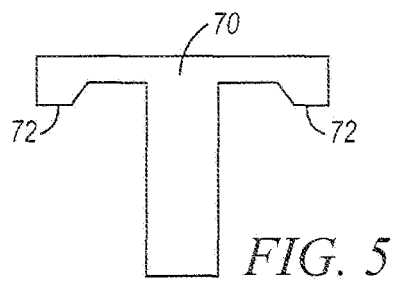
FIG. 5 depicts a retention feature according to a number of variations.

A truck 50 may also include a retention feature 70, for example as illustrated in FIG. 5, which may be located on the ceiling of the truck 50, approximately center of the width W of the truck 50, which may assist in securing cargo containers 98 in the truck 50 used in an inclined lift system 76, 78. The retention feature 70 may be any of a number of configurations including, but not limited to, a T-shape having a hook feature 72 on each end which may each be constructed and arranged to mate with a cargo container 98. In one variation, the retention feature 70 may extend down the center of the length L of the truck bed 52 and may support cargo containers 98 on both the left hand side 56 and the right hand side 54 of the truck 50. In another variation, each pair of right hand side 54 and left hand side 56 container slots 60 may share an individual retention feature 70 so that there may be several retention features attached along the length of the ceiling of the truck 50.

Figure 6:
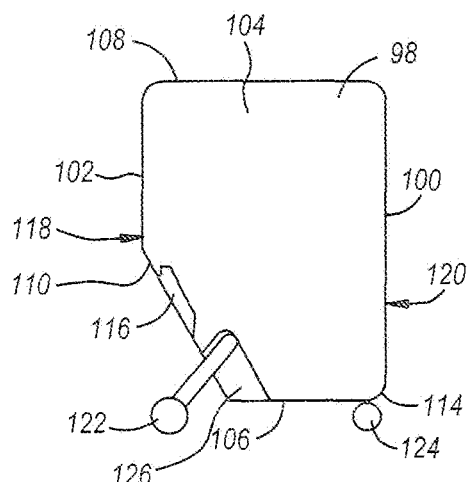
FIG. 6 depicts a side view of a cargo container according to a number of variations.
Figure 7:
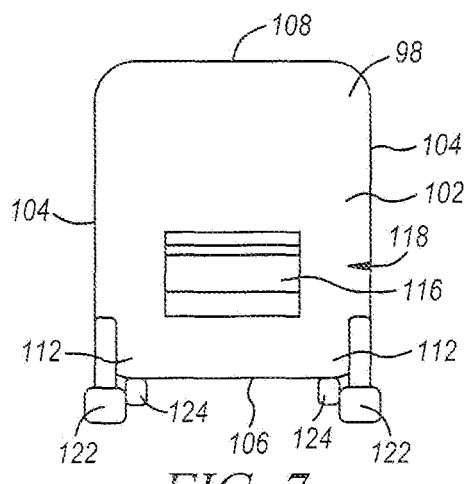
FIG. 7 depicts a rear view of a cargo container according to a number of variations.

Referring to FIGS. 6-7, in any of a number of variations, one or more cargo containers 98 may be used in the incline lift system 74. A cargo container 98 may be any of a number of shapes including, but not limited to, a box type shape. A box type shaped cargo container 98 may include a front wall 100 which opposes a rear wall 102, two opposing side walls 104, a base 106, and a lid 108. The lid 108 may be attached to the cargo container 98 for example by a hinging mechanism, or it may be a separate component. The rear side 118 of the cargo container 98 may have an inclined surface 110 which may begin approximately halfway down the length of the rear wall 102 and may extend towards the front side 120 of the cargo container 98. This may allow the container to lay flush with the inclined surface 80 of the motorized belt system 76, 78. The inclined surface 110 of the cargo container 98 may also include an attachment cavity 116 which may be constructed and arranged to mate with a hook feature 86 of the belt 82, 84. The cavity 116 may extend the width of the belt 82, for example as illustrated in FIG. 7. In another variation wherein the first belt 82 and the second belt 84 are offset, a cavity may extend the width of both the offset first belt 82 and second belt 84. This may allow the containers to be used universally with the first motorized belt system 76 or the second motorized belt system 78. The base 106 may include a set of stationary wheels 124 which may be placed adjacent the front end corners 114 of the cargo container 98. The rear side 118 of the cargo container 98 may include cutouts 126 adjacent the rear corners 112 which may be configured to accept spring loaded rear wheels 122. The wheels 122 may be spring loaded so that they may remain in an open position which may create a longer wheel base. The wheels 122 may then be retracted inwards so that they are flush with the incline of the container body 110. The lid 108 of the cargo container 98 may include a groove or indentation feature (not shown) which may mate with the retention feature 70 hook 72 attached to the ceiling of the truck 50.

Figure 8:
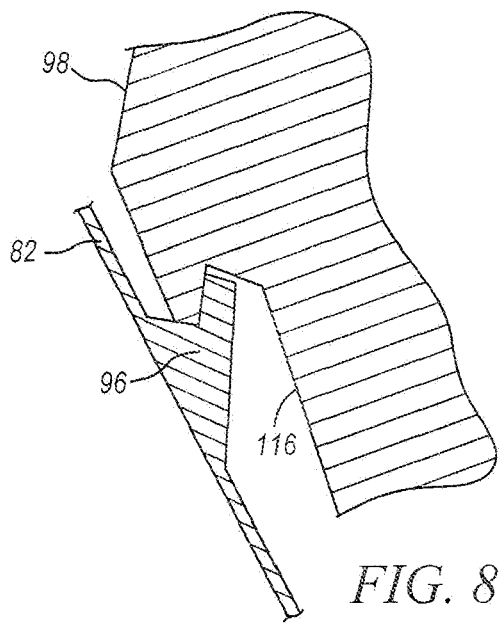
FIG. 8 depicts a close up of a belt hook feature and mating cargo container cavity feature according to a number of variations.
Figure 9:
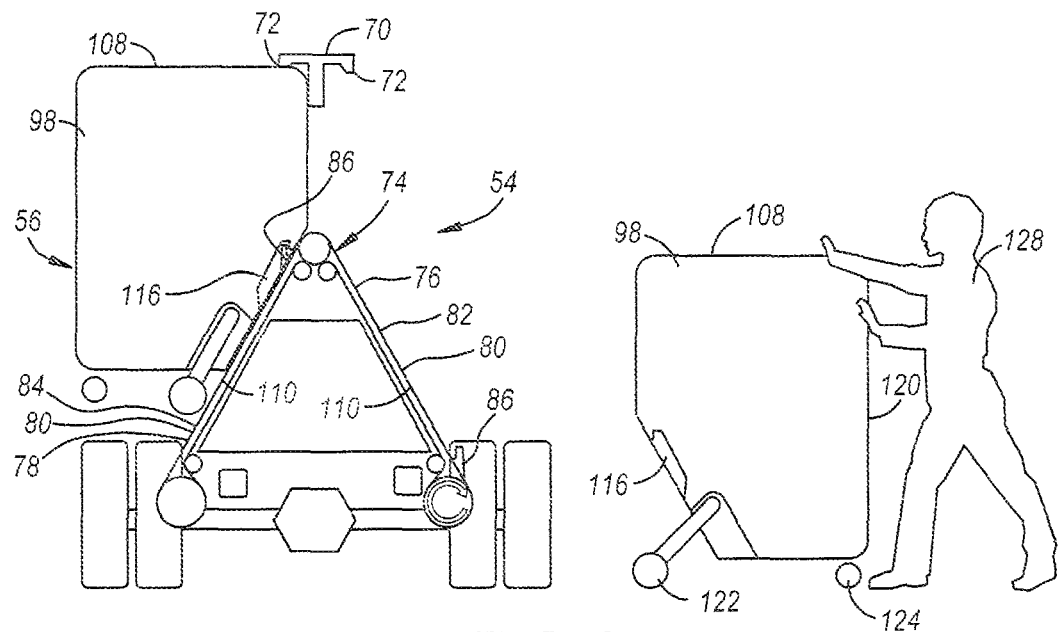
FIG. 9 depicts loading a cargo container into a truck with an incline lift system according to a number of variations.

Referring to FIGS. 8-11, an incline lift system 74 may be used to load cargo containers 98 onto a truck 50. In one variation, a cargo container 98 may be loaded onto the truck 50 via a loading position on either the right hand side 54 or left hand side 56 of the truck 50, for example as illustrated in FIG. 9. The incline lift system 74 may allow for quick loading and unloading of cargo from the truck 50 and may also allow for containers to be loaded and unloaded in any order and/or simultaneously. The incline lift system 74 may also minimize the loading and unloading area by eliminating the need for deploying ramps or lift platforms.

Figure 10:
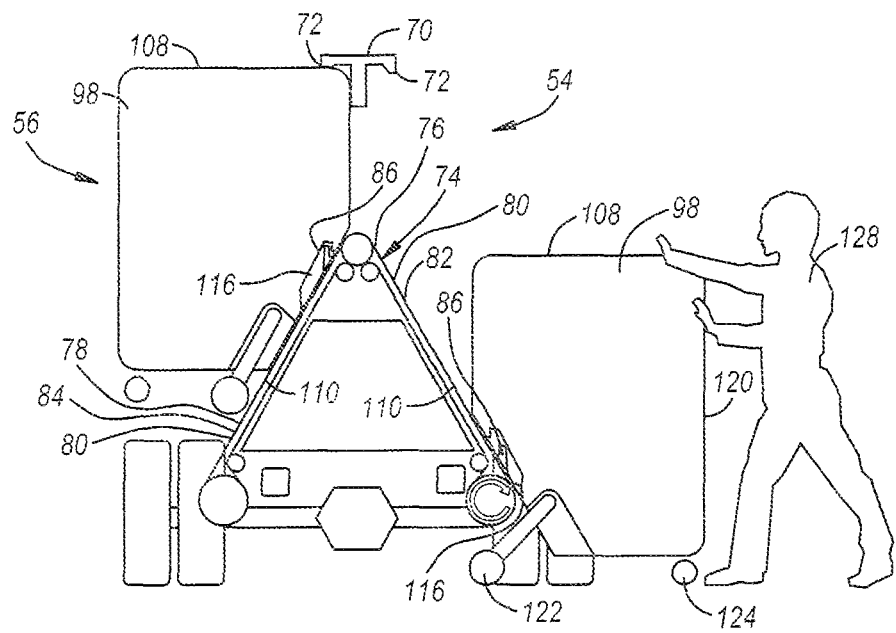
FIG. 10 depicts loading a cargo container into a truck with an incline lift system according to a number of variations.
Figure 11:
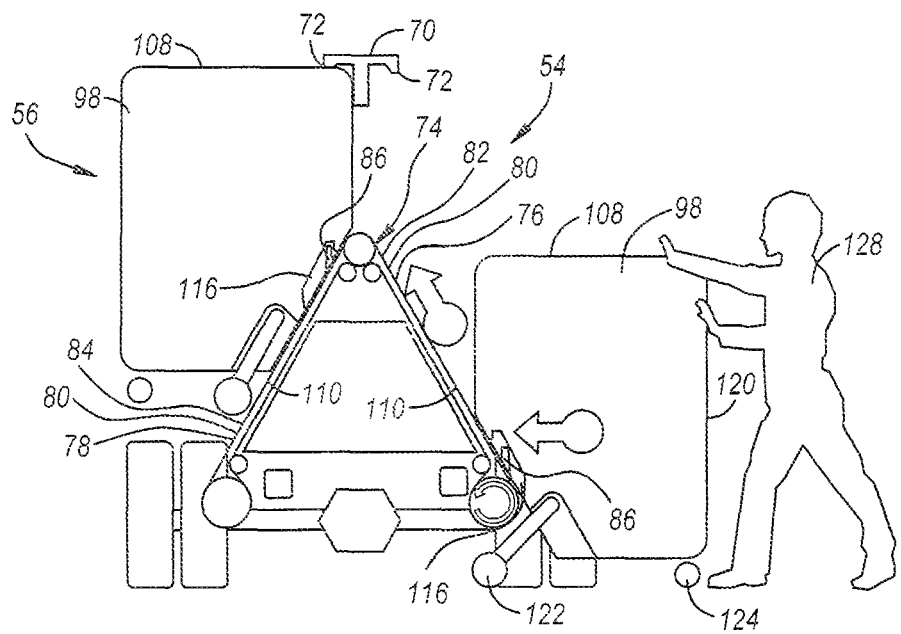
FIG. 11 depicts loading a cargo container into a truck with an incline lift system according to a number of variations.
Figure 12:
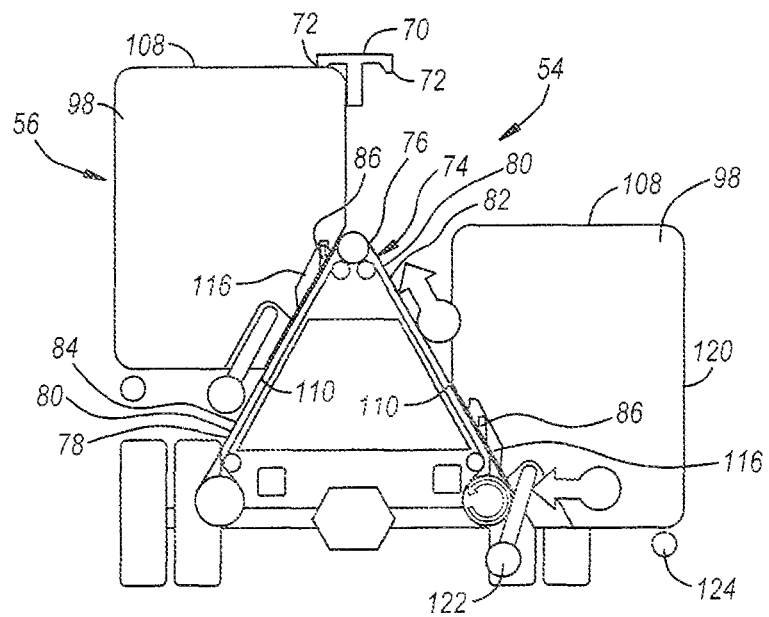
FIG. 12 depicts loading a cargo container into a truck with an incline lift system according to a number of variations.
Figure 13:
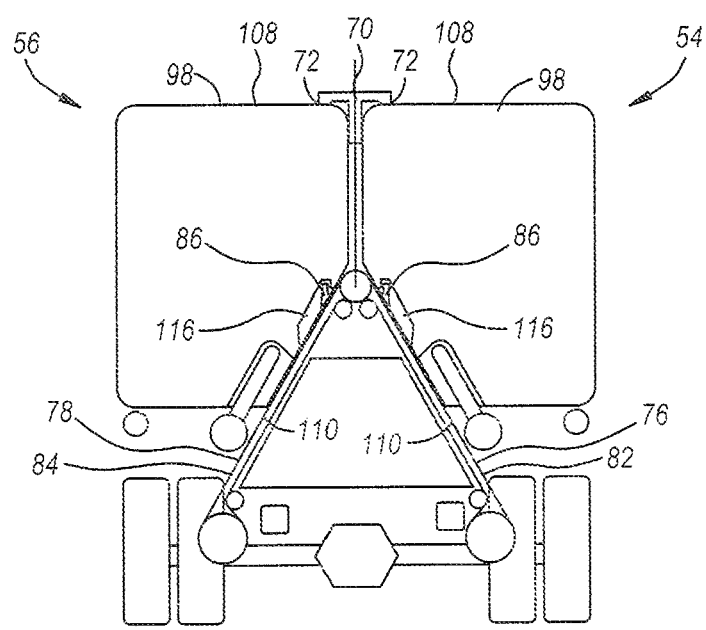
FIG. 13 depicts a truck including an incline lift system with cargo containers loaded into the truck.

The motorized lift belt hook feature 86 may be in a starting position at the bottom of the motorized belt system 76, 78. An operator 128 may push the front side 120 of a cargo container 98 which may include wheels 122, 124 by hand up to either side 54, 56 of the truck 50 so that it is in line with one of the container slots 60, for example as illustrated in FIG. 10. The operator 128 may then push the cargo container 98 up to the motorized belt system 76, 78 so that it touches the inclined surface 80 of the motorized belt system 76, 78. The motorized belt system 76, 78 may be turned on so that the belt 82, 84 begins to move upwards causing the belt hook feature 86 to travel upwards and engage the cavity 116 on the cargo container 98, for example as illustrated in FIGS. 8 and 11. Next, as the belt 82, 84 and belt hook feature 86 move upwards, the cargo container 98 may begin to lift off of the ground. As the cargo container 98 is lifted upwards, the spring loaded rear wheels 122 may begin to retract as the cargo container 98 raises up the motorized belt system 76, 78 for example as illustrated in FIG. 12. As the belt 82, 84 continues to move upwards, the spring loaded rear wheels 122 may retract so that they are flush against the inclined surface 110 of the cargo container 98. This may allow the cargo container 98 to be stored using less space and may allow for more stable transportation. Finally, as the belt hook feature 86 reaches the top of the incline lift system 74, the indentation or groove on the lid 108 of the cargo container 98 may engage the retention feature 70 hook 72 located on the ceiling of the truck 50 which may additionally secure the cargo container 98 during transit, for example as illustrated in FIG. 13. The motorized belt system 76, 78 may automatically shut off from the use of at least one positional sensor or may be manually shut off by the operator 128. The cargo containers 98 in this position may then be secured inside the truck 50 and ready for delivery.

Similarly, when a cargo load is ready for unloading, the motorized lift belt 76, 78 may be turned on so that the shafts 88, 92, 94, 96 turn in the opposite direction as used for loading which may cause the belt hook feature 86 to lower back to the starting position. As the belt hook feature 86 lowers back to its starting position, the spring loaded rear wheels 122 may gradually spring back to a longer wheel base which may provide for balanced mobility when the cargo container 98 is back on the ground. Once the belt 82, 84 lowers the belt hook feature 86 back to the starting position, the motorized belt system 76, 78 may automatically shut off from the use of at least one positional sensor, or it may be shut off manually by the operator.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: at least one incline lift system comprising: a first motorized belt system and a second motorized belt system; wherein the first motorized belt system and the second motorized belt system include a first belt and a second belt; wherein the first belt and the second belt each include a hooking feature; and wherein the first motorized belt system and the second motorized belt system are each inclined toward each other.

Variation 2 may include a product as set forth in Variation 1 wherein the hooking feature is constructed and arranged to mate with a cavity on a cargo container.

Variation 3 may include a product as set forth in any of Variations 1-2 wherein the first motorized belt system and the second motorized belt system each include a first shaft, a second shaft, a third shaft, and a fourth shaft; and wherein the first belt and the second belt are each located approximately central on a surface of the first motorized belt system and the second motorized belt system.

Variation 4 may include a product as set forth in any of Variations 1-3 wherein the first motorized belt system and the second motorized belt system share a central first shaft and wherein the first motorized belt system and the second motorized belt system each include a second shaft, a third shaft, and a fourth shaft; and wherein the first belt is offset from the second belt.

Variation 5 may include a product as set forth in any of Variations 1-4 wherein the first motorized belt system and the second motorized belt system are independently controlled by a control device.

Variation 6 may include a product as set forth in any of Variations 1-5 wherein the control device is a wireless remote.

Variation 7 may include a product as set forth in any of Variations 1-6 wherein a first control device is hardwired to the first motorized belt system and a second control device is hardwired to the second motorized belt system.

Variation 8 may include a product as set forth in any of Variations 1-7 wherein the first motorized belt system and the second motorized belt system are each powered by an independent motor.

Variation 9 may include a product as set forth in any of Variations 1-8 wherein the independent motors are electrical motors.

Variation 10 may include a product as set forth in any of Variations 1-9 wherein the first motorized belt and the second motorized belt include at least one positional sensor.

Variation 11 may include a product as set forth in any of Variations 1-10 wherein the first motorized belt and the second motorized belt each include at least one emergency stop device.

Variation 12 may include a product as set forth in any of Variations 1-11 further comprising a truck; wherein the truck includes a truck bed; wherein the truck bed includes at least one set of opposing cargo container slots; and wherein the first motorized belt system and the second motorized belt system are located in the opposing cargo container slots.

Variation 13 may include a product as set forth in Variation 12 wherein the truck further comprises a ceiling and wherein at least one retention feature is attached to the ceiling.

Variation 14 may include a product as set forth in any of Variations 12-13 wherein the at least one retention feature is constructed and arranged to mate with a lid of a cargo container.

Variation 15 may include a product as set forth in any of Variations 12-14 wherein a hollow structure is located within the first motorized belt system and the second motorized belt system and wherein the hollow structure is accessed through the rear of the truck.

Variation 16 may include a product as set forth in any of Variations 12-15 wherein at least one cargo container slot is used for storage.

Variation 17 may include a product as set forth in any of Variations 12-16 wherein the truck bed can be accessed from at least one of a left hand side, a right hand side, or a rear side.

Variation 18 may include a product as set forth in any of Variations 12-17 further comprising a cargo container; wherein the cargo container is attachable to the motorized belt system; wherein the cargo container further comprises a front wall, a rear wall, a pair of side walls, a base, and a lid; wherein the base includes a set of frontal wheels and a set of rear wheels; wherein the rear wheels are spring loaded; wherein the rear wall includes an incline; wherein the incline on the rear wall includes a cavity which is constructed and arranged to mate with a hooking feature; and wherein the lid includes an indent constructed and arranged to mate with a retention feature.

Variation 19 may include a method comprising: providing loading cargo from an outside surface into a truck using an incline lift system; wherein a cargo container is pushed up against a motorized belt system located inside of the truck; wherein the motorized belt system includes a hooking feature; wherein the hooking feature engages a cavity feature on the cargo container; wherein the motorized belt lifts the cargo container upwards into the truck; and wherein a retention feature on a ceiling of the truck engages with a lid of the cargo container.

Variation 20 may include a method comprising: providing unloading cargo off of a truck using an incline lift system; wherein the incline lift system includes lowering a cargo container from the truck using a motorized belt system having a hooking feature; wherein the hooking feature is engaged with a cavity feature on the cargo container; and wherein the motorized belt and hooking feature lowers the cargo container downwards onto a surface outside of the truck.

The above description of select examples of the invention is merely illustrative in nature and, thus, variations or variants thereof are not to be regarded as a departure from the spirit and scope of the invention.

What is claimed is:
1. A product comprising:
 a vehicle, wherein the vehicle comprises at least one incline lift system;
 the at least one incline lift system comprising:
 a first motorized belt system and a second motorized belt system;
 wherein the first motorized belt system and the second motorized belt system include a first belt and a second belt;
 wherein the first belt and the second belt each include a hooking feature; and
 wherein the first motorized belt system and the second motorized belt system are each inclined toward each other.

2. The product of claim 1 wherein the hooking feature is constructed and arranged to mate with a cavity on a cargo container.

3. The product of claim 1 wherein the first motorized belt system and the second motorized belt system each include a first shaft, a second shaft, a third shaft, and a fourth shaft; and wherein the first belt and the second belt are each located approximately central on a surface of the first motorized belt system and the second motorized belt system.

4. The product of claim 1 wherein the first motorized belt system and the second motorized belt system share a central first shaft and wherein the first motorized belt system and the second motorized belt system each include a second shaft, a third shaft, and a fourth shaft; and wherein the first belt is offset from the second belt.

5. The product of claim 1 wherein the first motorized belt system and the second motorized belt system are independently controlled by a control device.

6. The product of claim 5 wherein the control device is a wireless remote.

7. The product of claim 1 wherein a first control device is hardwired to the first motorized belt system and a second control device is hardwired to the second motorized belt system.

8. The product of claim 1 wherein the first motorized belt system and the second motorized belt system are each powered by an independent motor.

9. The product of claim 8 wherein the independent motors are electrical motors.

10. The product of claim 1 wherein the first motorized belt and the second motorized belt include at least one positional sensor.

11. The product of claim 1 wherein the first motorized belt and the second motorized belt each include at least one emergency stop device.

12. The product of claim 1 further comprising a truck;
wherein the truck includes a truck bed;
wherein the truck bed includes at least one set of opposing cargo container slots; and
wherein the first motorized belt system and the second motorized belt system are located in the opposing cargo container slots.

13. The product of claim 12 wherein the truck further comprises a ceiling and wherein at least one retention feature is attached to the ceiling.

14. The product of claim 13 wherein the at least one retention feature is constructed and arranged to mate with a lid of a cargo container.

15. The product of claim 12 wherein a hollow structure is located within the first motorized belt system and the second motorized belt system and wherein the hollow structure is accessed through the rear of the truck.

16. The product of claim 12 wherein at least one cargo container slot is used for storage.

17. The product of claim 12 wherein the truck bed can be accessed from at least one of a left hand side, a right hand side, or a rear side.

18. The product of claim 12 further comprising a cargo container;
wherein the cargo container is attachable to the motorized belt system;
wherein the cargo container further comprises a front wall, a rear wall, a pair of side walls, a base, and a lid;
wherein the base includes a set of frontal wheels and a set of rear wheels;
wherein the rear wheels are spring loaded;
wherein the rear wall includes an incline;
wherein the incline on the rear wall includes a cavity which is constructed and arranged to mate with a hooking feature; and
wherein the lid includes an indent constructed and arranged to mate with a retention feature.

\* \* \* \* \*